United States Patent [19]

Martinsson

[11] Patent Number: 4,871,103
[45] Date of Patent: Oct. 3, 1989

[54] SUPPORTING ARRANGEMENT FOR A MAST ON A VEHICLE

[76] Inventor: Lars M. R. Martinsson, Sikea 7238, S-915 00, Robertsfors, Sweden

[21] Appl. No.: 125,599

[22] Filed: Nov. 25, 1987

[30] Foreign Application Priority Data

Nov. 28, 1986 [SE] Sweden .................. 8605109

[51] Int. Cl.$^4$ ........................... B66B 9/20
[52] U.S. Cl. ........................ 224/310; 182/68; 224/42.03 R
[58] Field of Search ............... 224/310, 280, 281, 282, 224/309, 42.03 R, 42.07, 42.08; 52/143, 116–119; 182/64, 68

[56] References Cited

U.S. PATENT DOCUMENTS

| | | | |
|---|---|---|---|
| 2,611,580 | 9/1952 | Troche et al. | 52/117 |
| 3,112,041 | 11/1963 | Havens | 414/462 |
| 3,621,935 | 11/1971 | Bode | 182/68 |
| 3,672,549 | 6/1972 | Chorey | 224/310 |
| 3,804,207 | 4/1974 | Stonebraker et al. | 182/68 X |
| 4,291,823 | 9/1981 | Freeman et al. | 224/310 |
| 4,531,879 | 7/1985 | Horowitz | 414/462 |
| 4,630,990 | 12/1986 | Whiting | 224/42.03 R |
| 4,681,371 | 7/1987 | Leonard | 224/310 |

FOREIGN PATENT DOCUMENTS 863990 3/1961 United Kingdom .
1375407 11/1974 United Kingdom .
2171374 8/1986 United Kingdom .

*Primary Examiner*—Renee S. Luebke
*Attorney, Agent, or Firm*—Fleit, Jacobson, Cohn, Price, Holman & Stern

[57] ABSTRACT

An assembly for supporting an elongate mast in horizontal position atop a vehicle and for pivotal movement of the mast into a substantially vertical position behind the vehicle includes an elongate support frame which is attached to the roof of the vehicle. The frame has elongate guides and the mast has wheels which run in the guides. The wheels are located between the lengthwise point of balance of the mast and the back end of the frame. The mast has an inboard position in which it is supported horizontally on the frame and it can be moved to an outboard position at the end of the frame in which it can be pivoted vertically about the wheels.

3 Claims, 2 Drawing Sheets

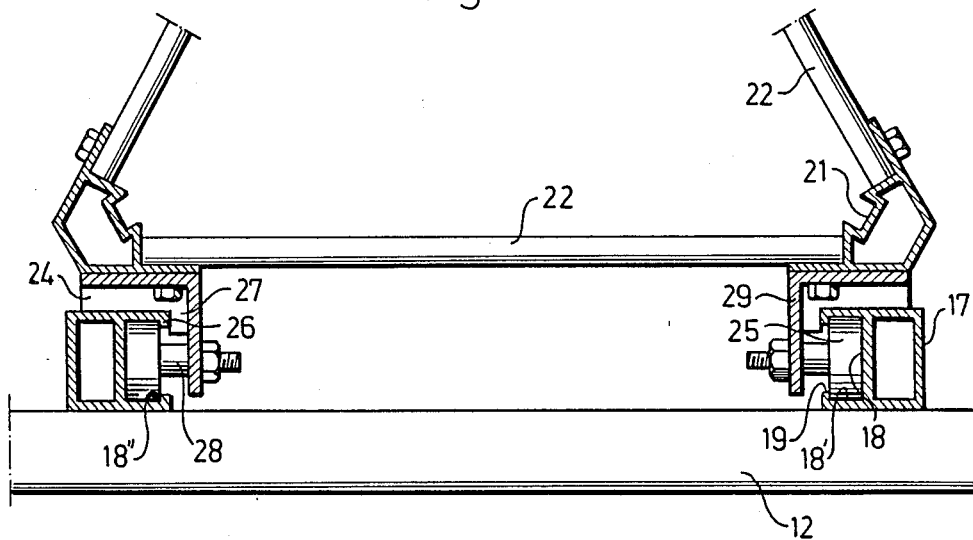
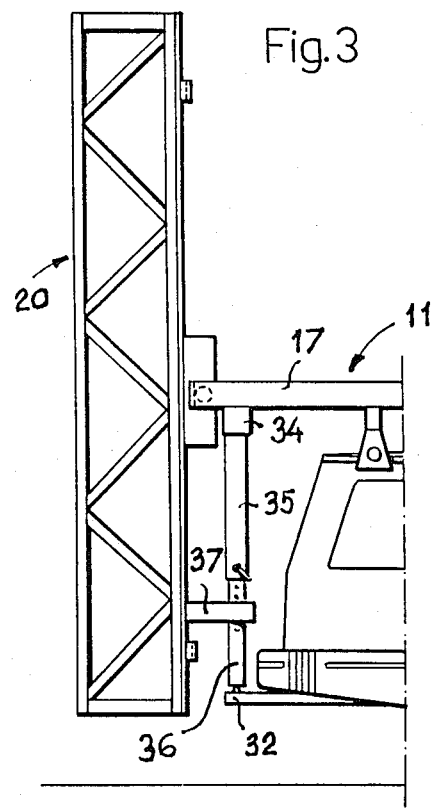

SUPPORTING ARRANGEMENT FOR A MAST ON A VEHICLE

BACKGROUND OF THE INFORMATION

The present invention relates to an arrangement for supporting a mast on a vehicle for pivoting movement around a transverse, substantially horizontal axis.

In the past, when mast members or other elongate members have been pivotally mounted on vehicles, they have been mounted for pivotal movement around a stationary pivot axis formed by a fixed bearing bracket. However, such a manner of mounting a mast member or other elongate member on a vehicle has severe drawbacks considerably restricting its field of use. For instance, it may not be used for mounting a comparatively long and heavy mast, such as a telescopic mast, in a pivotal state on a passenger car, a van, a minibus or other similar vehicle.

The invention has for its purpose to provide an improved arrangement of the kind initially specified, which avoids at least many of the drawbacks of the prior art.

SUMMARY OF THE INVENTION

In accordance with the invention, for the above purpose, there is proposed an arrangement of said kind, primarily characterized in that it comprises an elongate supporting frame which is adapted to be mounted in a fixed, substantially horizontal position on a vehicle and which is provided with longitudinally extending guide means for supporting means for said member by means of which said member may be supported in a substantially horizontal position on the supporting frame for guided movement in its longitudinal direction along said frame between a retracted, inner end position, in which it is firmly supported by the supporting frame, and a partially extracted outer end position, from which it may be swung relatively to the supporting frame around a transverse pivot axis defined by said supporting means.

The invention makes it possible to store even a comparatively heavy mast in a stable rest position on the roof of a vehicle, while simultaneously making it possible, when the mast is to be used, to have it raised to a substantially vertical position, in which the lower end of the mast is located only a short distance above the ground and in which the mast is stayed by the vehicle on the level of the supporting frame. Naturally, the mast may be additionally stayed. For instance, at its lower end it may be secured to a drawhook or a rear bumper of the vehicle, while at higher levels, it may be stayed by suitable wires or rods.

Preferably, the abovementioned pivot axis may be located at a position along said mast member, or elongate member, lying between the extractable outer end and the point of gravity of said member. Such a location of the pivot axis ensures that said member may rest in a comparatively stable manner on the supporting frame, even when it is located in its partially extracted outer end position.

In a preferred embodiment of the invention, said guide means comprise two parallel, longitudinally extending guide rails which are spaced apart from each other in the transverse direction of the supporting frame and which define two parallel guide grooves of generally U-shaped cross-section terminating into longitudinally extending openings in the guide rails, and said supporting means comprise at least one pair of axially aligned supporting wheels which are located in spaced apart positions in the transverse direction of said member and which are rotatably received, each in one of said guide grooves.

In said embodiment, the pivot axis may suitably be defined by the common rotary axis of said pair of axially aligned supporting wheels. Additionally, said longitudinally extending openings in the guide rails may preferably be formed by opposite lateral openings in said rails and the supporting wheels may be mounted on stub axles projecting into the guide grooves through said openings. In this case, the guide grooves may suitably be provided with longitudinally extending guide surfaces for holding the supporting wheels in laterally guided positions within the guide grooves.

Besides the supporting wheels above mentioned, the mast member, or other elongate member, may have at least one pair of additional supporting means which are spaced apart from said supporting wheels in the longitudinal direction of said member. Said additional supporting means may consist of slide-bearing means.

The supporting frame should preferably be provided with attachment means by which it may be mounted easily removable on the roof of a car, a bus, or other similar vehicle. Moreover, at its rear end, the supporting frame may be provided with a supporting post by which said frame may rest on a drawhook or other similar support on the vehicle.

BRIEF DESCRIPTION OF THE DRAWINGS

Below, the invention will be further described with reference to the accompanying drawings, in which:

FIG. 2 shows a partial view, on an enlarged scale and in section taken along line II—II in FIG. 1, and FIG. 3 shows a fragmentary view, similar to the left hand portion of FIG. 1, but illustrating a slightly modified embodiment of the invention.

DESCRIPTION OF PREFERRED EMBODIMENTS

Figure 1:
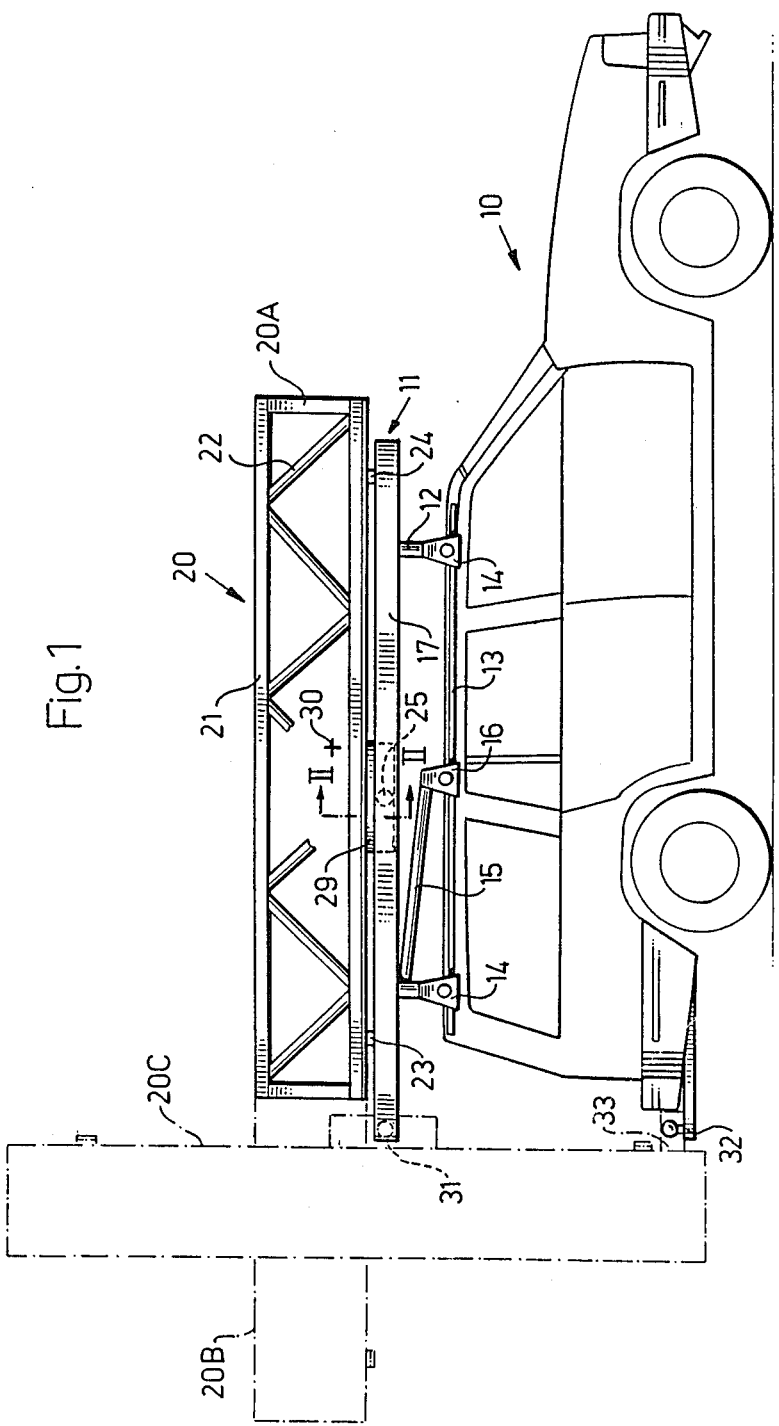
FIG. 1 shows a side elevation of an arrangement according to an embodiment of the invention, selected by way of example only, illustrating said arrangement mounted on a vehicle.

In the drawings, reference numeral 10 generally designates a car of station-wagon type, on which an elongate, generally rectangular supporting frame 11 is mounted by means of attachments 14, provided at the outer ends of two transverse bars 12 of said frame and releasably secured to drip mouldings 13 on the roof of the car. In order to stabilize frame 11 on car 10, frame 11 is connected to said drip mouldings 13 also by means of inclined tie rods 15 provided with attachments 16.

The supporting frame 11 comprises two parallel, longitudinally extending guide rails 17 which are spaced apart in the transversal direction of said frame and rigidly connected to each other by means of the two transversally extending rods 12. As can be seen from FIG. 2, the two guide rails 17 form two parallel guide grooves 18 of generally U-shaped cross-section which terminate into opposite, longitudinally extending lateral openings 19 in rails 17.

Reference numeral 20 designates a mast member which, in the illustrated case, consists of a latticework of triangular cross-section, comprising three longitudinally extending bars 21 and a plurality of bracing bars 22. The illustrated mast member 20 may form an outer section of a telescopic mast also comprising a number of inner mast sections, not shown.

In FIG. 1, mast member 20 has been shown in full lines in a substantially horizontal rest position, in which it is supported on frame 11 through supporting means comprising a pair of rear sliding blocks 23, a pair of front sliding blocks 24 and a pair of supporting wheels 25 which are rotatably mounted on mast member 20 near the middle of its length. Sliding blocks 23 and 24 rest slidably against the upper surfaces of guide rails 17, while wheels 25 are rotatably received within guide grooves 18 and rest against the bottom surfaces 18' of said grooves.

In order to ensure that supporting wheels 25 will be held in appropriate laterally guided positions within guide grooves 18, guide rails 17 are provided with low guide flanges 26 at each side of openings 19. These flanges 26 form guide surfaces 18" facing the interior of grooves 18. Besides, at least the foremost sliding blocks 24 are provided with depending guide flanges 27 (FIG. 2) located on the inner side of the respective guide rails 17. Hereby, mast member 20 will be held in appropriate alignment with guide rails 17, i.e. in a position in which it extends parallel to said rails.

Supporting wheels 25 are rotatably mounted in axially aligned positions on stub axles 28, each of which is carried by an adjacent leg of a short L-profile piece 29, the other leg of which is secured to mast member 20.

Below, the function of the arrangement above described will be explained with reference to FIG. 1. In said Figure, mast member 20 has been shown in full lines in an inner end position 20A, which may be determined by any suitable stop means, not shown in the drawings. Preferably, locking means, not shown, may be provided to permit the mast member to be locked in said position.

From said inner end position, mast member 20 may be pulled out in a horizontal direction from frame 11 to a partially extracted outer end position 20B, shown in dash-dotted lines, in which it may still rest in a horizontal position on frame 11, provided that the resultant point of gravity 30 of mast member 20 (i.e. the point of lengthwise balance of the mast member) is located to the right of supporting wheels 25. When mast member 20 has been partially extracted from frame 11 to position 20B, which is defined by stop abutments 31 in grooves 18, it may be swung around a pivot axis defined by axles 28 from position 20B to a substantially vertical position 20C, shown in dash-dotted lines, without being hindered by supporting frame 11. In order to make it possible to lock mast member 20 in said vertical position 20C, in which it has its lower end located only at a very short distance above the ground, mast member 20 may be provided with suitable coupling means 33 for connecting it to a drawhook 32 of the car 10 as diagramatically illustrated in FIG. 1.

Upon applying any further stays to mast member 20, the mast will be ready for use and any inner mast sections previously located in retracted positions within member 20 may be elevated to cause the total height of the mast to reach a value several times higher than the length of of mast member 20.

FIG. 3 illustrates a slightly modified embodiment, in which a telescopic supporting post, comprising an upper tubular section 35 and a lower section 36, is mounted depending from a crossbar 34 at the rear end of supporting frame 17. Said supporting post rests on a drawhook 32 of car 10 to provide an additional support for the rear end portion of frame 17. In this embodiment, coupling means 33 have been replaced by coupling means 37 by which the lower end portion of mast member 20 may be connected to the lower post section 36.

The invention is not restricted to the embodiments above described and shown in the drawings. Instead, many alternative embodiments are feasible within the scope of the invention. For instance, member 20 need not consist of a mast member but may be formed by any other elongate member. Moreover, the pivot axis of member 20 need not be formed by the common rotary axis of wheels 25. Instead, said pivot axis may be formed by a pivotal joint between member 20 and a supporting carriage mounted for guided movement along guide rails 17.

I claim:

1. An assembly for supporting an elongate mast in horizontal position atop a vehicle and for pivotal movement of the mast into a substantially vertical position behind the vehicle, the assembly including an elongate support frame, attachment means for securing the frame atop the vehicle in substantially horizontal position with one end of the frame toward the rear of the vehicle and an opposite end of the frame toward the front of the vehicle, bearing means carried by the mast, longitudinal guide means on the frame receiving the bearing means for lengthwise movement of the bearing means along the guide means whereby the mast is supported for lengthwise movement along the frame, and pivot means providing a pivot connection between the mast and the bearing means, the pivot means defining a transverse pivot axis at a lengthwise location along the mast adjacent a point of lengthwise balance of the mast, the mast having an inboard position on the frame wherein the mast is supported horizontally on the frame and the pivot axis is remote from said one end of the frame between said one end of the frame and the point of lengthwise balance of the mast, and the mast having an outboard position on the frame wherein the pivot axis is adjacent said one end of the frame and the mast can be pivoted to a substantially vertical position about the pivot axis, wherein the frame includes a pair of spaced longitudinal guide rails with elongate grooves defining the guide means, wherein the bearing means comprises wheels received in the respective grooves and wherein the pivot means comprises transverse stub axles connected between the mast and the wheels.

2. An assembly as defined in claim 1 wherein said grooves includes flanges for retaining the wheels in the grooves.

3. An assembly for supporting an elongate mast in horizontal position atop a vehicle and for pivotal movement of the mast into a substantially vertical position behind the vehicle, the assembly including an elongate support frame, attachment means for securing the frame atop the vehicle in substantially horizontal position with one end of the frame toward the rear of the vehicle and an opposite end of the frame toward the front of the vehicle, bearing means carried by the mast, longitudinal guide means on the frame receiving the bearing means for lengthwise movement of the bearing means along the guide means whereby the mast is supported for lengthwise movement along the frame, and pivot means providing a pivot connection between the mast and the bearing means, the pivot means defining a transverse pivot axis at a lengthwise location along the mast adjacent a point of lengthwise balance of the mast, the mast having an inboard position on the frame wherein the mast is supported horizontally on the frame and the pivot axis is remote from said one end of the frame between said one end of the frame and the point of lengthwise balance of the mast, and the mast having an outboard position on the frame wherein the pivot axis is adjacent said one end of the frame and the mast can be pivoted to a substantially vertical position about the pivot axis, wherein the mast includes at least one support member spaced from the bearing means for supporting the mast on the frame and wherein the support member comprises a slide bearing for sliding along the frame.

* * * * *